US010728322B2

(12) United States Patent
Tessier et al.

(10) Patent No.: US 10,728,322 B2
(45) Date of Patent: Jul. 28, 2020

(54) DETERMINING TRANSFERABILITY OF A COMPUTING RESOURCE TO A CLOUD COMPUTING ENVIRONMENT

(71) Applicant: Hewlett-Packard Development Company, L.P., Fort Collins, CO (US)

(72) Inventors: Jacques Tessier, Ottawa (CA); Darren E Brust, Austin, TX (US); Sandro J Joseph Del-Re, Mississauga (CA); Peter M Gaines, Alpharetta, GA (US); Jambey Clinkscales, Snellville, GA (US); Jack E Strukel, Corvallis, OR (US); Chadd A Schwartz, Sylvania, OH (US); Kevin Morgan, Alpharetta, GA (US)

(73) Assignee: MICRO FOCUS LLC, Santa Clara, CA (US)

( * ) Notice: Subject to any disclaimer, the term of this patent is extended or adjusted under 35 U.S.C. 154(b) by 1276 days.

(21) Appl. No.: 14/764,973

(22) PCT Filed: Jan. 31, 2013

(86) PCT No.: PCT/US2013/024200
§ 371 (c)(1),
(2) Date: Jul. 30, 2015

(87) PCT Pub. No.: WO2014/120218
PCT Pub. Date: Aug. 7, 2014

(65) Prior Publication Data
US 2015/0373103 A1    Dec. 24, 2015

(51) Int. Cl.
*H04L 12/16*    (2006.01)
*H04L 29/08*    (2006.01)
(Continued)

(52) U.S. Cl.
CPC ........ *H04L 67/1095* (2013.01); *G06F 9/5072* (2013.01); *H04L 43/04* (2013.01)

(58) Field of Classification Search
CPC ..... H04L 67/1095; H04L 43/04; G06Q 10/06; G06F 9/5072
See application file for complete search history.

(56) References Cited

U.S. PATENT DOCUMENTS

| 7,268,782 B2 * | 9/2007 | Ebert | G06Q 10/06 345/440 |
|---|---|---|---|
| 7,757,214 B1 * | 7/2010 | Palczak | G06F 9/5083 709/223 |

(Continued)

FOREIGN PATENT DOCUMENTS

| EP | 2400441 A1 | 12/2011 |
|---|---|---|
| IN | 04599CH2012 | 11/2012 |

(Continued)

OTHER PUBLICATIONS

Extended European Search Report dated Jul. 7, 2016, EP Patent Application No. 13873960.2 dated Jul. 31, 2015, European Patent Office, 8 pages.

(Continued)

*Primary Examiner* — Philip J Chea
*Assistant Examiner* — Wuji Chen

(57) ABSTRACT

An embodiment of the present technique may in a method for generating a report related to the transferability of an application to a cloud computing environment. The method may include receiving data related to characteristics of the application. The method may include comparing, via a processor, the data received to predetermined dimensions related to the transferability of an application to a cloud computing environment to determine a comparison value indicating how close the data is to each dimension. The (Continued)

method may include generating, via the processor, a report based on the comparison.

16 Claims, 9 Drawing Sheets

(51) Int. Cl.
*G06F 9/50* (2006.01)
*H04L 12/26* (2006.01)

(56) References Cited

U.S. PATENT DOCUMENTS

| | | | |
|---|---|---|---|
| 8,363,806 B2 | 1/2013 | Bookstaff | |
| 9,791,837 B2* | 10/2017 | Slessman | G05B 13/02 |
| 2004/0070624 A1* | 4/2004 | Fushimi | G06F 16/248 |
| | | | 715/771 |
| 2008/0201414 A1 | 8/2008 | Syed et al. | |
| 2010/0125473 A1* | 5/2010 | Tung | G06F 9/5072 |
| | | | 709/200 |
| 2010/0332889 A1* | 12/2010 | Shneorson | G06Q 10/04 |
| | | | 714/2 |
| 2011/0125895 A1* | 5/2011 | Anderson | H04L 9/3213 |
| | | | 709/224 |
| 2011/0252420 A1 | 10/2011 | Tung et al. | |
| 2011/0295999 A1* | 12/2011 | Ferris | G06F 9/5072 |
| | | | 709/224 |
| 2011/0320236 A1* | 12/2011 | Altuwaijri | G06Q 10/06 |
| | | | 705/7.23 |
| 2012/0016715 A1* | 1/2012 | Brown | G06Q 10/06 |
| | | | 705/7.29 |
| 2012/0054731 A1* | 3/2012 | Aravamudan | G06F 8/63 |
| | | | 717/170 |
| 2012/0131173 A1* | 5/2012 | Ferris | G06F 9/5066 |
| | | | 709/224 |
| 2012/0137001 A1* | 5/2012 | Ferris | H04L 67/16 |
| | | | 709/226 |
| 2012/0166963 A1 | 6/2012 | Kohli et al. | |
| 2012/0222084 A1* | 8/2012 | Beaty | H04L 43/0817 |
| | | | 726/1 |
| 2012/0239739 A1* | 9/2012 | Manglik | G06F 9/5077 |
| | | | 709/203 |
| 2012/0254640 A1 | 10/2012 | Agarwala et al. | |
| 2012/0291140 A1 | 11/2012 | Arnaud et al. | |
| 2013/0111491 A1* | 5/2013 | Glew | G06F 11/30 |
| | | | 718/104 |
| 2013/0124714 A1* | 5/2013 | Bednar | G06F 9/45558 |
| | | | 709/224 |
| 2013/0275409 A1* | 10/2013 | Moganti | H04L 67/1097 |
| | | | 707/722 |
| 2014/0040880 A1* | 2/2014 | Brownlow | G06F 8/60 |
| | | | 717/177 |
| 2014/0122577 A1* | 5/2014 | Balasubramanian | |
| | | | G06F 9/5072 |
| | | | 709/203 |
| 2014/0229607 A1* | 8/2014 | Jung | H04L 43/0876 |
| | | | 709/224 |
| 2014/0279201 A1* | 9/2014 | Iyoob | G06Q 30/0631 |
| | | | 705/26.7 |
| 2014/0317166 A1* | 10/2014 | Iyoob | G06Q 30/0631 |
| | | | 709/201 |
| 2014/0359129 A1* | 12/2014 | Sharma | H04L 47/70 |
| | | | 709/226 |
| 2014/0365266 A1* | 12/2014 | Sethi | G06Q 10/0633 |
| | | | 705/7.27 |
| 2015/0074278 A1* | 3/2015 | Maes | H04L 47/70 |
| | | | 709/226 |
| 2015/0324182 A1* | 11/2015 | Barros | G06F 8/61 |
| | | | 717/174 |
| 2015/0341240 A1* | 11/2015 | Iyoob | H04L 43/08 |
| | | | 709/201 |
| 2015/0348054 A1* | 12/2015 | Ogawa | G06Q 10/0635 |
| | | | 705/317 |
| 2015/0363396 A1* | 12/2015 | Sengupta | G06F 16/214 |
| | | | 707/609 |
| 2017/0017505 A1* | 1/2017 | Bijani | G06F 9/44505 |

FOREIGN PATENT DOCUMENTS

| | | |
|---|---|---|
| WO | WO-03048982 | 6/2003 |
| WO | WO-2012021324 | 2/2012 |
| WO | WO-2013025196 | 2/2013 |

OTHER PUBLICATIONS

"Cloud Enabled Application Transformation"; Wipro IT Business 2013; 1 page.

PCT: "Notification of Transmittal of the International Search Report and the Written Opinion of the International Searching Authority, or the Declaration"; cited in PCT/US2013/024200; dated Jul. 30, 2013; 9 pages.

* cited by examiner

| 306 Category | 302 Dimensions | | 304 Factors | Answer |
|---|---|---|---|---|
| Business | Regulatory | 308 | Regulatory Factor 1 | |
| Business | Regulatory | 308 | Regulatory Factor 2 | |
| Business | Vendor Support | 310 | Vendor Support Factor 1 | |
| Business | Vendor Support | 310 | Vendor Support Factor 2 | |
| Business | Geography | 312 | Geography Factor 1 | |
| Business | Geography | 312 | Geography Factor 2 | |
| Business | Service Availability | 314 | Service Availability Factor 1 | |
| Business | Service Availability | 314 | Service Availability Factor 2 | |
| Business | Workload Variability | 316 | Workload Variability Factor 1 | |
| Business | Workload Variability | 316 | Workload Variability Factor 1 | |
| Business | Security | 318 | Security Factor 1 | |
| Business | Security | 318 | Security Factor 2 | |

300
FIG. 3

| 406 Category | 402 Dimensions | | 404 Factors | Answer |
|---|---|---|---|---|
| Technical | Infrastructure Compatibility | 408 | Infrastructure Compatibility Factor 1 | |
| Technical | Infrastructure Compatibility | 408 | Infrastructure Compatibility Factor 2 | |
| Technical | Cloud Operating Module | 410 | Cloud Operating Factor 1 | |
| Technical | Cloud Operating Module | 410 | Cloud Operating Factor 2 | |
| Technical | Internet Suitability | 412 | Internet Suitability Factor 1 | |
| Technical | Internet Suitability | 412 | Internet Suitability Factor 2 | |
| Technical | Performance | 414 | Performance Factor 1 | |
| Technical | Performance | 414 | Performance Factor 2 | |
| Technical | Architecture | 416 | Architecture Factor 1 | |
| Technical | Architecture | 416 | Architecture Factor 2 | |
| Technical | Interfaces | 418 | Interface Factor 1 | |
| Technical | Interfaces | 418 | Interface Factor 2 | |

DETERMINING TRANSFERABILITY OF A COMPUTING RESOURCE TO A CLOUD COMPUTING ENVIRONMENT

TECHNICAL FIELD

The present technique relates generally to transferring computing resources to a cloud computing environment. Specifically, the present technique relates to determining transferability of computing resources to the cloud computing environment.

BACKGROUND

Some computing devices communicate via a network of computing resources including servers, host computing devices, storage devices, applications, and the like. A cloud computing environment provides remote services including software, data, computation, and the like, to a client computing device. Rather than performing all services locally on the client computing device or on a private server, some users may benefit from relocating computing resources to the cloud computing environment.

BRIEF DESCRIPTION OF THE DRAWINGS

Certain embodiments are described in the following detailed description and in reference to the drawings, in which:

FIG. 3 is a dimension table illustrating business dimensions including factors related to characteristics of the computing resource;

FIG. 4 is a dimension table illustrating technical dimensions including factors related to characteristics of the computing resource;

DETAILED DESCRIPTION OF SPECIFIC EMBODIMENTS

The techniques disclosed herein relate generally to analyzing transferability of a computing resource to a cloud computing environment. There are many factors to consider when a user is deciding whether to transfer their computing resources such as computing programs, computing applications, databases, and the like, to a cloud computing environment. The transferability of computing resources to the cloud computing environment may be evaluated based on dimensions related to a business of the user and dimensions related to technology detail of computing resources of the user.

Figure 1:
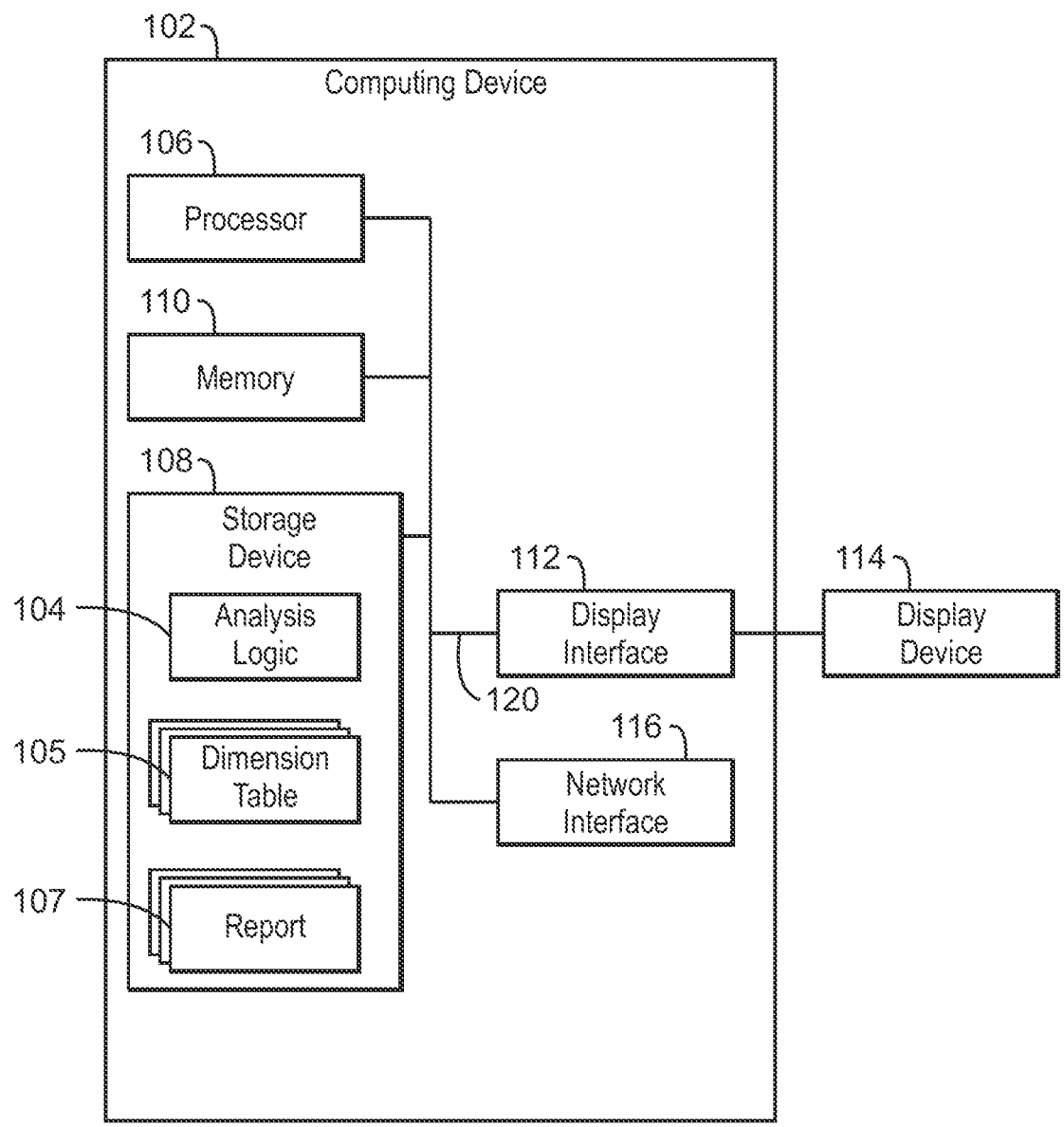
FIG. 1 is a block diagram illustrating a system including a computing device having analysis logic to determine transferability of computing resources to a cloud computing environment.

FIG. 1 is a block diagram illustrating a system 100 including a computing device 102 having analysis logic 104 to determine transferability of computing resources to a cloud computing environment. The computing device 102 may be, for example, a laptop computer, desktop computer, tablet computer, mobile device, server, or cellular phone, a wearable computing device, among others. The computing device 104 may include a processor 106 and a storage device 108. The processor 106 can be a single core processor, a multi-core processor, a computing cluster, or any number of other configurations. The processor 106 may be implemented as Complex Instruction Set Computer (CISC) or Reduced Instruction Set Computer (RISC) processors, x86 Instruction set compatible processors, multi-core, or any other microprocessor or central processing unit (CPU). In some embodiments, the main processor 106 includes dual-core processor(s), dual-core mobile processor(s), or the like.

The computing device 102 may include a memory device 110. The memory device 110 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems.

The processor 106 may be connected through a system bus 120 (e.g., PCI, ISA, PCI-Express, HyperTransport®, NuBus, etc.) to a display interface 112 adapted to connect the computing device 102 to a display device 114. The display device 114 may include a display screen that is a built-in component of the computing device 102. The display device 114 may also include a computer monitor, television, or projector, among others, that is externally connected to the computing device 102.

The storage device 108 may be a non-transitory computer-readable medium. The storage device 108 may have instructions stored thereon that when executed by the processor 106 cause the computing device 102 to perform operations. The operations may be executed by logic at least partially comprising hardware logic. Hardware logic at least partially includes hardware and may also include software or firmware. Hardware logic may include electronic hardware including interconnected electronic components to perform logic operations on the computing device 102. Electronic hardware may include individual chips/circuits and distributed information processing systems.

The storage device 108 may include dimensions related to the transferability of a computing resource to a cloud computing environment. In some embodiments, the dimensions may be determined by an operator of the system 100. The dimensions are concepts that are related to the transferability of the computing resource to a cloud computing environment. Each of the dimensions may include factors related to transferability that may be evaluated with respect to a specific computing resource. The dimensions may be stored on storage device 108 in one or more dimension tables 105 including the factors. The operations may include receiving data related to characteristics of the application. In some embodiments, the data may be received via input from the user of the system 100. The operations may include comparing the data received to the dimensions to determine a comparison value indicating how close the data is to the dimension. The operations may include generating one or more reports 107 based on the comparison. The comparison and the report generation may be carried out by the analysis logic 104 and the report 107 may be stored on the storage device 108.

As mentioned above, the dimensions may be determined by an operator of the system 100. The dimensions may belong to a category including a business category or a technical category. The business category includes dimensions related to business-related factors that may enable or prevent the transfer of a computing resource to a cloud computing environment. The technical category includes dimensions related to the technical characteristics of the application or of the user. The operator of the system 100 may predetermine the dimensions based on changes in cloud computing environments, technology, and the like.

A "computing resource," as referred to herein, is any component used to carry out computation, communication, and the like. A computing resource may be data storage capacity, processing resources, software applications, and the like. The dimensions of either the technical category or the business category may include factors related to the characteristics of the computing resource.

Figure 2:
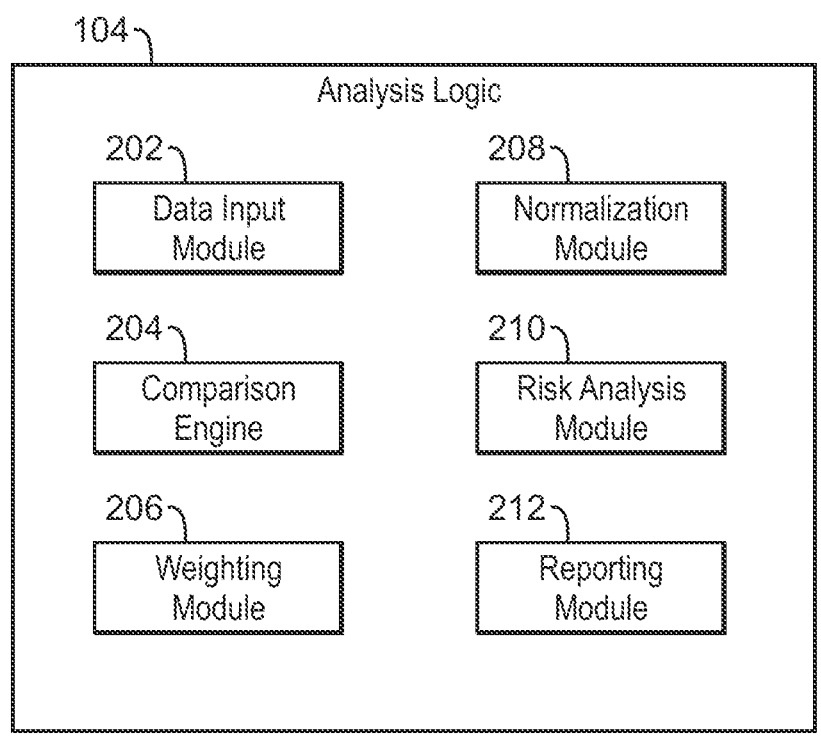
FIG. 2 is a block diagram illustrating the analysis logic.

FIG. 2 is a block diagram illustrating the analysis logic 104. The analysis logic 104 may include a data input module 202, a comparison engine 204, a weighting module 206, normalization module 208, a risk analysis module 210, and a reporting module 212.

The data input module 202 is configured to receive data, including the factors discussed above, related to the characteristics of the computing resource. In some embodiments, the data input module 202 may gather data via a graphical user interface rendered on a display device, such as the display device 114 of FIG. 1. The data may be gathered in the form of a questionnaire including questions associated the factors, as discussed below in regard to FIG. 3 and FIG. 4.

The comparison engine 204 is configured to compare the data received to an associated dimension to determine a comparison value. A comparison value may reflect how close the received data is to the dimensions. The comparison value may be a percentage. If the received data reflects that every factor of a given dimension has been met, the comparison value may be 100%, for example. In some cases, the comparison value may be less than 100% depending on how many of the questions for any given dimension are answered in the affirmative.

The comparison engine 204 may be configured to determine a type of computing environment for which the computing resource is most suitable based on how close the received data is to the dimensions. Determining the type of computing environment may include selecting the type from a group. The group of cloud computing environments may include a public cloud computing environment, a private off-premise cloud computing environment, a private on-premise cloud computing environment, and a dedicated computing environment. A public could computing environment, as referred to herein, is a cloud computing environment where the computing resources, such as applications, storage devices, and the like, are made available to the general public by a service provider. A private-off premise computing environment, as referred to herein, is a cloud computing environment is a cloud environment, located remotely from the geographic location of the user that is operated solely for a single organization or user. A private on-premise computing environment, as referred to herein, is a cloud computing environment located at the geographic location of the user. A dedicated computing environment, as referred to herein, is a computing environment that includes computing resources such as a server, which is leased, or owned, exclusively by a user of the computing resources.

The weighting module 206 is configured to weight the data received based on input from a user. For example, the data may include factors from a regulatory dimension of the business category. The weighting module 206 is configured to enable the user to weight some factors heavier than others. For example, the weighting module 206 may weight some regulatory dimensions factors that indicate issues with running an application on a public cloud computing environment heavier than factors that are related to whether the application may be more suitable to run on the private cloud computing environment or the dedicated computing environment.

The normalization module 208 is configured to normalize the comparison value based on a minimum value required for each dimension in relation to the type of cloud computing environment determined. A minimum value may be predetermined by an operator of the system 100. For example, the comparison value for the infrastructure dimension may be required to be at least 75% for a public cloud computing environment. In contrast, the comparison value for the cloud operating model may be required to be at least 90% for a public cloud computing environment. Therefore, in this example, a comparison value of 75% for the infrastructure dimension may be normalized with a comparison value of 90% for the cloud operating model dimension.

The risk analysis module 210 is configured to identify a risk value associated with the transferability of the application to the cloud computing environment. The risk value is identified based on a subset of values associated with the received data. The analysis logic 104 may direct the processor 106 to provide a risk mitigation recommendation based on the risk value. For example, each of the factors of the dimensions discussed above may be associated with a risk value indicating the risk for transferring a computing resource to a cloud computing environment. The risk values associated with each factor may be provided in the generated report. In some embodiments, the risk values may be averaged and associated with an average risk value of low, medium, high. In some embodiments, the generated report may also include recommendations related to mitigation of the risk indicated by the risk value.

The reporting module 212 is configured to generate a report based on the data received. The generated report may include diagrams and textual explanation related to the transferability of a computing resource to a cloud computing environment. In some embodiments, the report generated may include spider diagrams, as illustrated below in FIGS. 5 to 7. The report generated may also include a recommendation for a type of computing environment for which transfer of the computing resource is suitable.

FIG. 3 is a dimension table 300 illustrating business dimensions 302 including factors 304 related to characteristics of the computing resource. The dimensions 302 in the dimension table 300 are dimensions of a business category 306. The dimensions of the business category 306 may include regulatory 308, vendor support 310, geography 312, service availability 314, workload variability 316, and security 318. Each of the business category 306 dimensions 302 includes factors 304 related to whether the user's business is compatible for transferring computing resources to the cloud computing environment.

The regulatory dimension 308 includes factors 304 related to whether there are regulatory issues that may prevent a computing resource from being executed in a cloud computing environment. For example, the factors 304 of the regulatory dimension may include whether an application is subject to regulatory requirements such as FISMA, HIPPA, and the like, or other regulations that may require the application to run on a government certified operating system image. Computing resources that are identified as having regulatory factors that are prohibitive to running on a public cloud computing environment may be more suitable for a private cloud computing environment or a dedicated computing environment.

The vendor support dimension 310 includes the factors 304 related to whether a vendor of any of a computing resource supports an instance of the computer resource in the cloud computing environment. For example, an application may be required to operate on a vendor certified operating system image.

The geography dimension 312 includes the factors 304 related to whether there are any issues relating to geography that prevent a computing resource from transferring to a cloud computing environment. For example, the geographic location of a user base may be a factor of the geography dimension when determining the transferability of a computing resource to the cloud computing environment.

The service availability dimension 314 includes the factors 304 related to whether a computing resource has a required service level, has an ability to automatically restart upon failure. For example, if a computing resource, such as an application, has an inability to automatically restart upon failure, the application may be best suited for a private cloud computing environment that may enable a user to restart the application.

The workload variability dimension 316 includes factors 304 related to whether the user's workload variability is well-suited for a cloud computing environment. For example, there may be unpredictable workloads associated with the computing resource. Unpredictable workloads, including peaks of usage may be a factor in the functionality of the computing resource in a cloud computing environment.

The security dimension 318 includes the factors 304 related to whether the computing resources include security restraints. For example, if a computing resource, such as an application, has security restraints that prohibit the use of the computing resource in a public cloud computing environment, the application may be best suited for a private cloud computing environment. As another example, an application may require a certain level of encryption not available in a public cloud computing environment.

FIG. 4 is a dimension table 400 illustrating technical dimensions 402 including factors 404 related to characteristics of the computing resource. The dimensions 402 in the dimension table 400 are dimensions of a technical category 406. The dimensions of the technical category 406 may include infrastructure compatibility 408, cloud computing model 410, internet stability 412, performance 414, architecture 416, and interfaces 418.

The infrastructure compatibility dimension 408 includes the factors 404 related to whether the computing resources are compatible with an infrastructure of a cloud computing environment. For example, the factors of the infrastructure compatibility dimension may include, for example, licensing restrictions, physical hardware dependencies, legacy operating system dependencies, and the like.

The cloud computing model dimension 410 includes the factors 404 related to whether the computing resources are compatible with a cloud computing environment. For example, the factors 404 of the cloud computing model dimension 410 may include whether the computing resource, such as an application, requires any customization of a cloud computing operating system to support the application. As another example, the factors 404 of the cloud computing model dimension 410 may include whether the computing resource, such as an application, utilizes proprietary clustering technology.

The internet stability dimension 412 includes the factors 404 related to whether the computing resources are suitable for a cloud computing environment. For example, the factors 404 of the internet stability dimension 412 may include whether the level of performance of standard internet connectivity is sufficient for an application, or whether the application uses standard internet protocols. As another example, the factors 404 of the internet stability dimension 412 may include the level of reliability that may be required for an application, or whether the level of security associated with standard internet connectivity, such as HTTPS, will be sufficient for an application.

The performance dimension 414 includes the factors 404 related to whether the computing resources are compatible in terms of bandwidth and latency. For example, the factors 404 of the performance dimension may include a required data bandwidth associated with a computing resource, or an acceptable level of data latency.

The architecture dimension 416 includes the factors 404 related to whether the computing resources are suitable for a cloud computing environment. For example, the factors 404 of the architecture dimension 416 may include whether a computing resource benefits from parallel processing, the communication architecture, whether the computing resource can scale horizontally or vertically, whether the computing resource is considered contextual or core, and the like. Other examples of the factors 404 of the architecture dimension 416 may include whether a computing resource, such as an application, relies on any services or components that are written in legacy software technologies or languages and whether the application is based on modern software technologies and languages.

The interfaces dimension 418 includes the factors 404 related to whether the computing resources have any issues that would prevent the computing resources to be transferred to a cloud computing environment. For example, the factors 404 of the interfaces dimension 418 may include whether the computing resource has related communication, data, and interface protocols that are well defined and documented.

Data describing the characteristics of the computing resource may be received for each of the factors 404. In some embodiments, the data may be received via a questionnaire filled in by the user. The questionnaire may be displayed on a graphical user interface of a display device, such as the display device 114 of FIG. 1. The data may be received by analysis logic, such as the analysis logic 104 of FIG. 1, and the analysis logic may carry out the operations as described above including determining how close the received data is to the dimensions of each category, and generating a report describing the analysis performed by the analysis logic 104.

Figure 5:
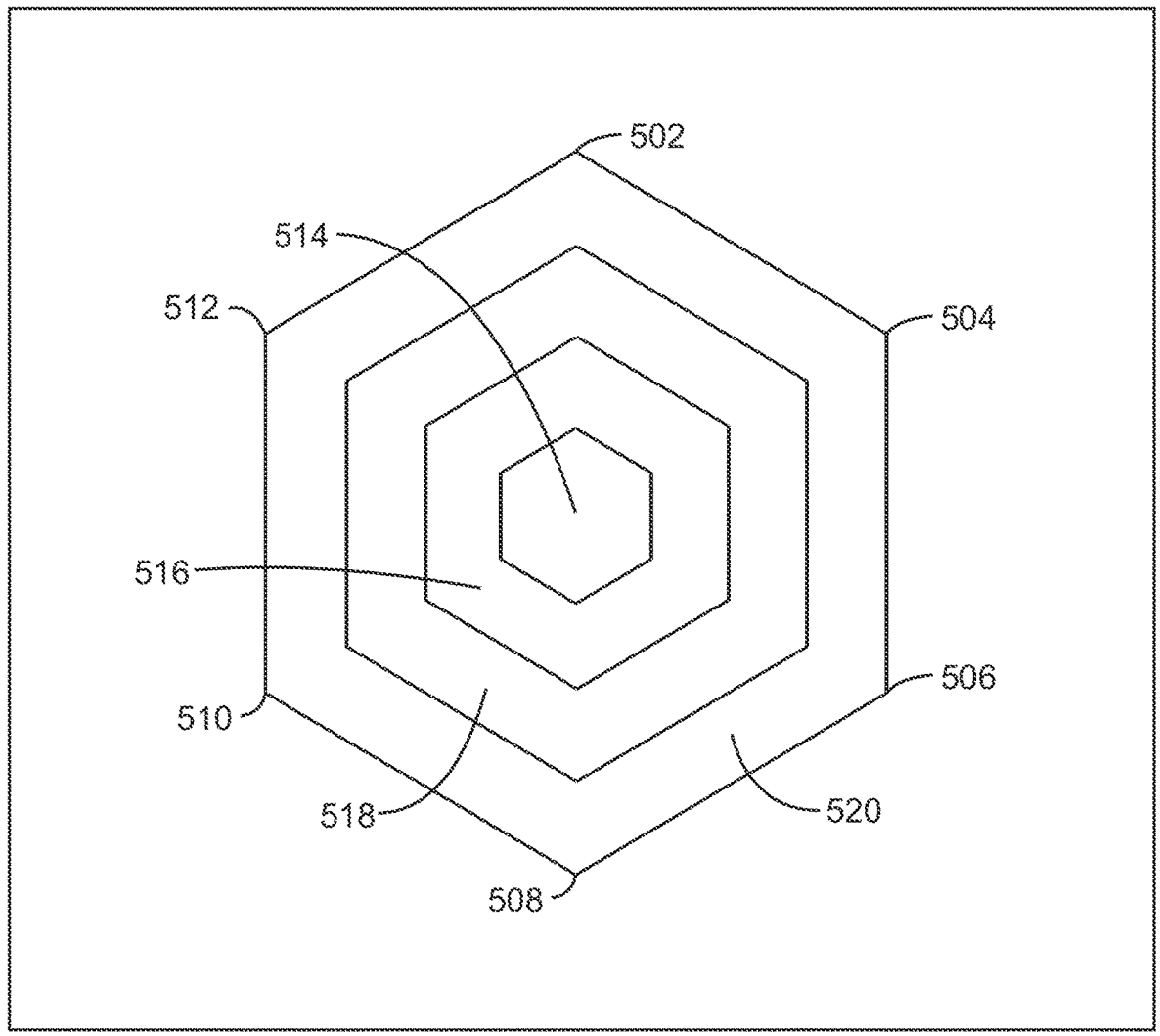
FIG. 5 is a diagram illustrating layers that relate to the types of computing environments.

FIG. 5 is a diagram 500 illustrating layers that relate to types of computing environments. As illustrated, the diagram 500 may include vertices 502, 504, 506, 508, 510, and 512, wherein each vertex may be associated with a dimension of either the business category or the technical category. The diagram 500 may include layers 514, 516, 518, 520, wherein a layer may be associated with a type of computing environment. The layer 514 may be associated with the dedicated computing environment. The layer 516 may be associated with the private on-premise cloud computing environment. The layer 518 may be associated with the private off-premise computing environment. The layer 520 may be associated with a public cloud computing environment.

Figure 6:
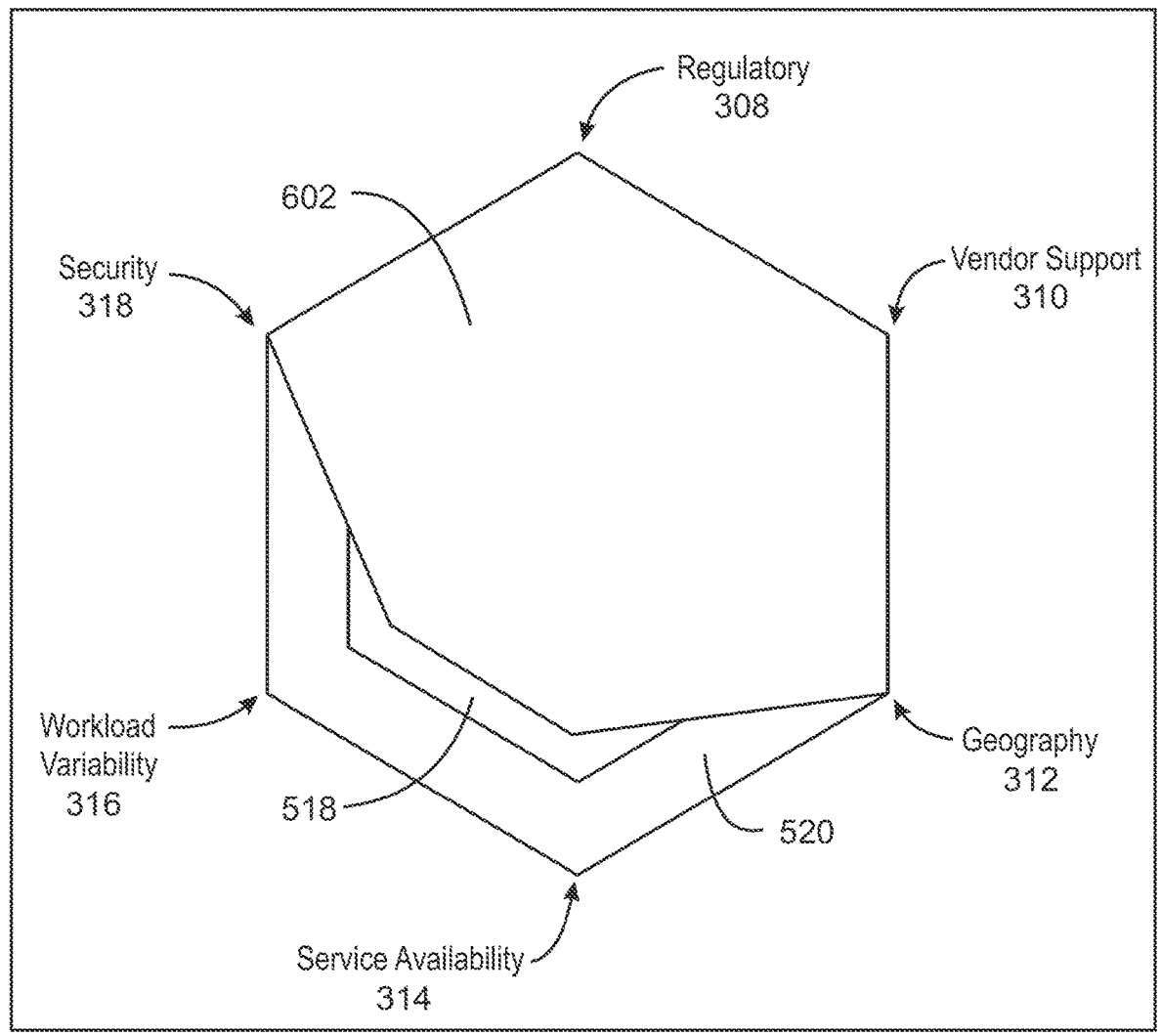
FIG. 6 is a diagram illustrating how close the received data along each business dimension is to a computing environment layer.

FIG. 6 is a diagram 600 illustrating how close the received data along each business dimension is to a computing environment layer. As discussed above in reference to FIG. 1, the business category includes six dimensions: regulatory 308, vendor support 310, geography 312, service availability 314, workload variability 316, and security 318. An area, as indicated by 602, may be associated with the characteristics of the application for which the data is received. The extent to which the area 602 covers a particular layer of the diagram 600 indicates the transferability of the corresponding computing resource to the particular type of computing system represented by the layer. The diagram 600 illustrates the data received indicates a close-fit in relation to the regulatory dimension 308, the vendor support dimension 310, the geography dimension 312, and the security dimension 318 for a public cloud computing environment associated with the layer 520. The diagram 600 also illustrates a poor fit for a private off-premise cloud computing environment associated with the layer 518, for the service availability dimension 314 and the workload variability dimension 316. Additionally, although not shown on the diagram 600, the data received in this example illustrates that the data received indicates a good fit for all dimensions of the business category including the private on-premise cloud computing environment, and the dedicated computing environment, respectively associated with the layers 516 and 514 of FIG. 5.

Figure 7:
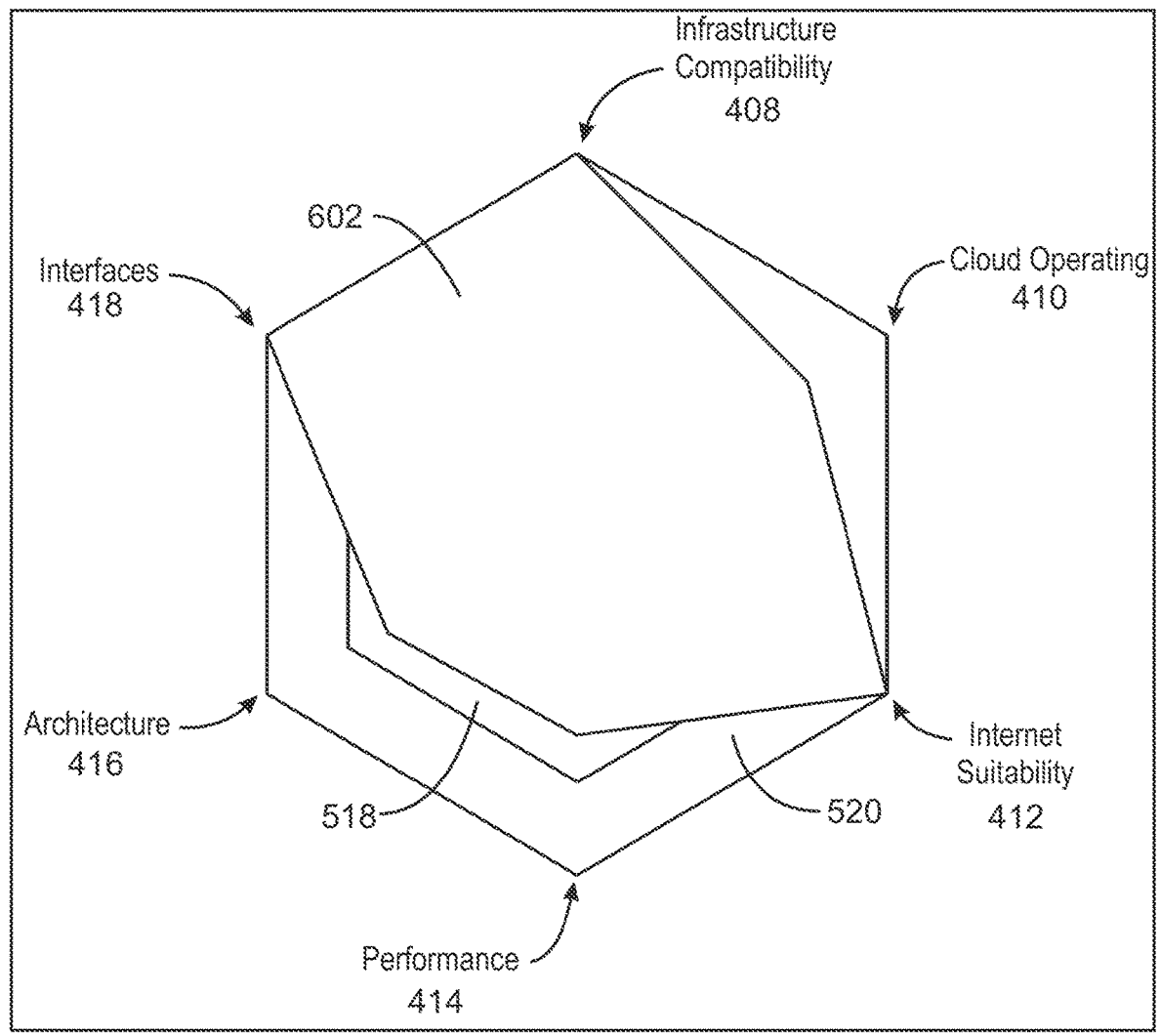
FIG. 7 is a diagram illustrating how close the received data along each technical dimension is to a computing environment layer.

FIG. 7 is a diagram 700 illustrating how close the received data along each technical dimension is to a computing environment layer. As discussed above in reference to FIG. 4, the technical category 406 includes six dimensions: infrastructure compatibility 408, cloud operating model 410, internet suitability 412, performance 414, architecture 416, and interfaces 418. An area, as indicated by 602, may be associated with the characteristics of the application for which the data is received. The diagram 700 illustrates the data received indicates a close-fit for some of the dimensions as the area 602 fills some of the dimensions of the diagram 700. For example, the diagram 700 illustrates the data received indicates a close-fit in relation to the infrastructure compatibility dimension 408 and the interfaces dimension 418 for a public cloud computing environment associated with the layer 520. The diagram 700 also illustrates a poor fit for a private off-premise cloud computing environment associated with the layer 518, for the performance dimension 414 and the architecture dimension 416. Additionally, although not shown on the diagram 600, the data received in this example illustrates that the data received indicates a good fit for all dimensions of the technical category including the private on-premise cloud computing environment, and the dedicated computing environment, respectively associated with the layers 516 and 514 of FIG. 5.

Figure 8:
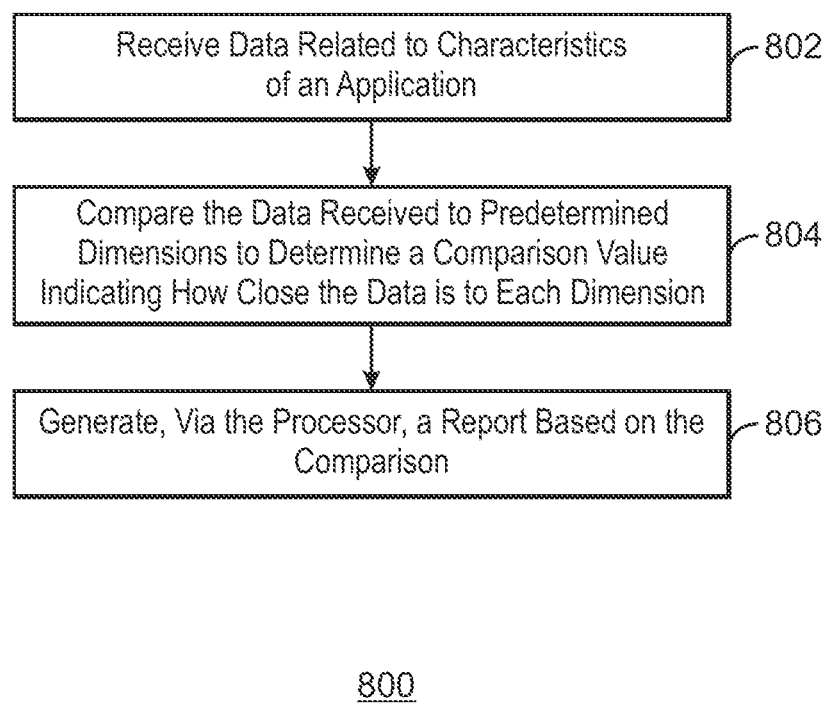
FIG. 8 is a block diagram illustrating a method 800 for generating a report related to the transferability of a computing resource to a cloud computing environment.

FIG. 8 is a block diagram illustrating a method 800 for generating a report related to the transferability of a computing resource to a cloud computing environment. The method 800 may include receiving, at block 802, data related to characteristics of the application. The method 800 may include comparing, at block 804, via a processor, the data received to predetermined dimensions related to the transferability of the computing resource to a cloud computing environment to determine a comparison value indicating how close the data is to each dimension. The method 800 may include generating, at block 806, via the processor, a report based on the comparison.

In some embodiments, the dimensions comprise factors related to the characteristics of the application. For example, one of the dimensions may be related to the security requirements of the application. One factor of the security dimension may be whether the application requires data encryption.

In some embodiments, the data received may be weighted. In this embodiment, the method 800 may include weighting the data received based on input from a user.

In some embodiments, generating the report, at block 808, may include determining a type of computing environment for which transfer of an application is suitable. In this embodiment, determining the type of computing environment includes selecting the type from a group. The group may include a public cloud computing environment, a private off-premise cloud computing environment, a private on-premise cloud computing environment; and a dedicated computing environment.

In some embodiments, the method 800 may include normalizing the comparison value based on a minimum value required for each dimension in relation to the type of cloud computing environment determined. For example, the comparison value for the infrastructure dimension may be required to be at least 75% for a public cloud computing environment. In contrast, the comparison value for the cloud operating model may be required to be at least 90% for a public cloud computing environment. Therefore, the method 800 may include normalizing the data based on the minimum values.

In some embodiments, the method 800 may include determining categories including at least some of the dimensions, the categories including a business category comprising dimensions related to business characteristics of a user. The method 800 may include determining categories including at least some of the dimensions, the categories including a technical category comprising dimensions related to the technical characteristics of the application or of a user.

In some embodiments, the method 800 may include transferring the application to the cloud based on the report. In this embodiment, transferring the application to the cloud computing environment may include installing servers to host the application.

In some embodiments, the method 800 may include identifying a risk value associated with the transferability of the application to the cloud computing environment, wherein the risk value is identified based on a subset of values associated with the factors. In this embodiment, the method 800 may include providing a risk mitigation recommendation in the report generated based on the risk value.

Figure 9:
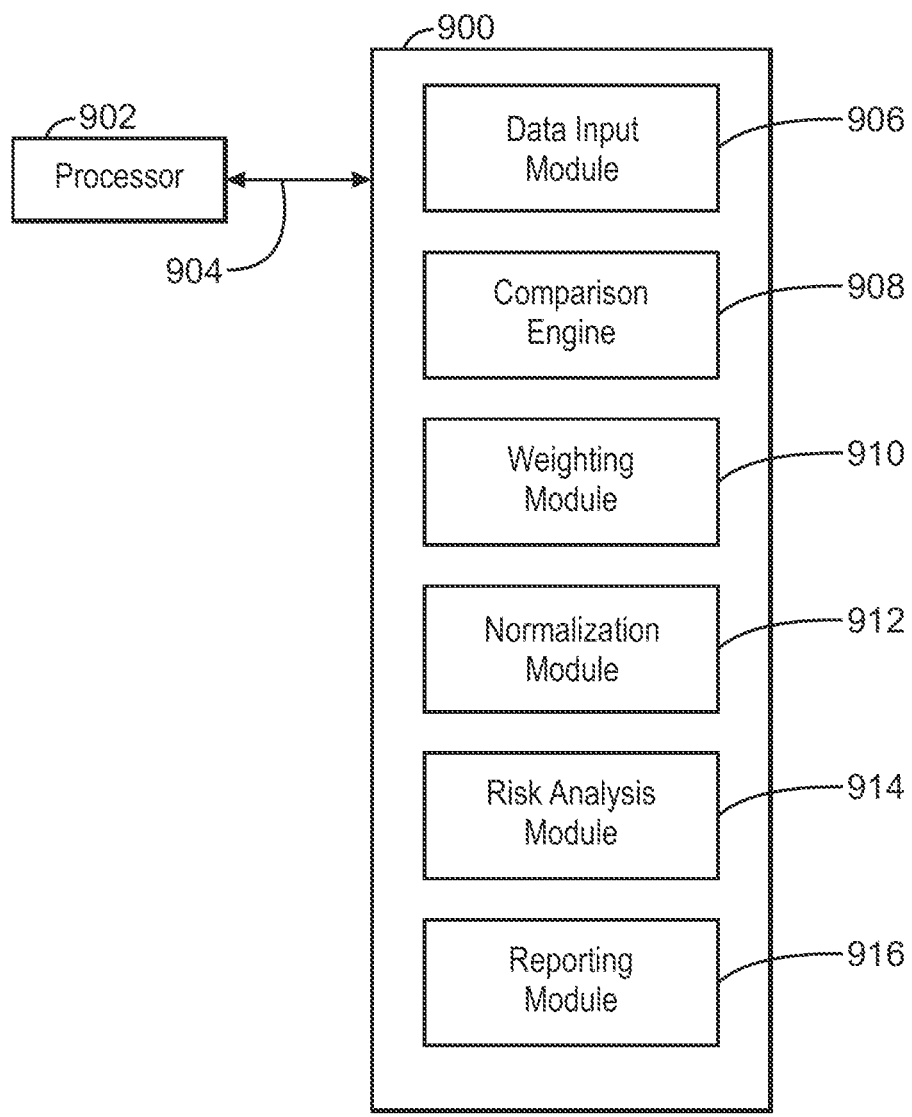
FIG. 9 is a block diagram showing a tangible, machine-readable medium that stores code adapted to determine the transferability of a computing resource to a cloud computing environment.

FIG. 9 is a block diagram showing a tangible, non-transitory, computer-readable medium that stores code adapted to determine the transferability of a computing resource to a cloud computing environment. The computer-readable medium is generally referred to by the reference number 900. The computer-readable medium 900 can comprise Random Access Memory (RAM), a hard disk drive, an array of hard disk drives, an optical drive, an array of optical drives, a non-volatile memory, a Universal Serial Bus (USB) flash drive, a DVD, a CD, and the like. In one embodiment of the present invention, the computer-readable medium 900 can be accessed by a processor 902 over a computer bus 904.

The various software components discussed herein can be stored on the tangible, non-transitory computer-readable medium 900 as indicated in FIG. 9. For example, a first block 906 can include a data input module to receive data related to the characteristics of the computing resource. A second block 908 can include a comparison engine configured to compare the data received to a predetermined dimension related to the transferability of an application to a cloud computing environment to determine a comparison value. A third block 910 can include a weighting module configured to weight the data received based on input from a user. A fourth block 912 can include a normalization module 208 configured to normalize the comparison value based on a minimum value required for each dimension in relation to the type of cloud computing environment determined. A fifth block 914 can include a risk analysis module 210 is configured to identify a risk value associated with the transferability of the application to the cloud computing environment. A sixth block 916 can include a reporting module configured to generate a report based on the data received.

Although shown as contiguous blocks, the software components can be stored in any order or configuration. For example, if the computer-readable medium 400 is a hard drive, the software components can be stored in non-contiguous, or even overlapping, sectors.

What has been described and illustrated herein is a preferred embodiment of the invention along with some of its variations. The terms, descriptions and figures used herein are set from by way of illustration only and are not meant as limitations. Those skilled in the art will recognize that many variations are possible within the scope of the invention, which is intended to be defined by the following claims—and there equivalents—in which all terms are meant in their broadest reasonable sense unless otherwise indicated.

What is claimed is:

1. A system, comprising:
 a processor; and
 a non-transitory computer-readable medium, comprising instructions that, when executed by the processor, direct the processor to:
  receive first data related to characteristics of a computing resource;
  compare the characteristics to a plurality of predetermined business dimensions related to transferability of the computing resource to a cloud computing environment, and the plurality of predetermined business dimensions comprise at least one of a first dimension corresponding to a vendor support for the computing resource in the cloud computing environment, a second dimension corresponding to a geographic restriction for the computing resource in the cloud computing environment, a third dimension corresponding to a service level availability for the computing resource in the cloud computing environment, a fourth dimension corresponding to a workload compatibility for the computing resource in the cloud computing environment, or a fifth dimension corresponding to a security restriction for the computing resource in the cloud computing environment; and
  based on the comparison of the characteristics to the plurality of predetermined business dimensions, provide second data to display, on a graphical user interface, a report, wherein the report comprises a first polygon layer associated with the computing resource and having vertices corresponding to the plurality of predetermined business dimensions, and the report comprises a second polygon layer associated with the cloud computing environment and having vertices corresponding to the plurality of predetermined business dimensions.

2. The system of claim 1, wherein the instructions, when executed by the processor, further direct the processor to provide third data to display, on the graphical user interface, a plurality of polygon layers associated with a plurality of computing environments, and the plurality of polygon layers includes the second polygon layer.

3. The system of claim 2, wherein the plurality of computing environments comprises at least one computing environment of the following:
 a public cloud computing environment;
 a private off-premise cloud computing environment;
 a private on-premise cloud computing environment; or
 a dedicated computing environment.

4. The system of claim 2, wherein the instructions, when executed by the processor, further direct the processor to determine a plurality of comparison values for the plurality of computing environments, normalize the plurality of comparison values based on minimum values for the plurality of predetermined business dimensions to provide normalized values, and generate the third data to display the plurality of polygon layers on the graphical user interface based on the normalized values.

5. The system of claim 1, wherein the plurality of predetermined business dimensions comprises a regulatory dimension corresponding to a regulatory issue corresponding to a use of the computing resource in the cloud computing environment.

6. The system of claim 1, wherein the plurality of predetermined business dimensions includes the second dimension, and the geographic restriction comprises a geographic restriction for a user base associated with the computing resource.

7. A method, comprising:
 receiving data related to characteristics of an application;
 comparing, via a processor, the characteristics to a plurality of predetermined technical dimensions related to a transferability of the application to a cloud computing environment to determine how close the data is to each technical dimension of the plurality of predetermined technical dimensions, and the plurality of predetermined technical dimensions comprises at least one of a first dimension corresponding to whether the application is compatible with an infrastructure of the cloud computing environment, a second dimension corresponding to whether the application uses a customized cloud computing operating system, a third dimension corresponding to a clustering technology restriction for the application, or a fourth dimension corresponding to sufficiency of internet connectivity for the application; and
 generating data, via the processor, to display, on a and a graphical user interface, a report representing a result of the comparison of the characteristics to the plurality of predetermined technical dimensions, wherein the report comprises a first polygon layer corresponding to the application and a plurality of second polygon layers corresponding to environment types for the cloud computing environment, wherein the first polygon layer comprises vertices corresponding to the plurality of predetermined technical dimensions, and each polygon layer of the plurality of second polygon layers comprises vertices corresponding to the plurality of predetermined technical dimensions.

8. The method of claim 7, wherein the plurality of predetermined technical dimensions comprises a fifth dimension corresponding to whether the application uses data encryption.

9. The method of claim 7, wherein the environment types correspond to at least one environment of the following:
   a public cloud computing environment;
   a private off-premise cloud computing environment;
   a private on-premise cloud computing environment; or
   a dedicated computing environment.

10. The method of claim 7, further comprising initiating transfer of the application to the cloud computing environment based on the report, wherein the transfer of the application to the cloud computing environment comprises performing an action to instantiate servers to host the application.

11. The method of claim 7, further comprising:
   identifying a risk value associated with the transferability of the application to the cloud computing environment, wherein the risk value is identified based on a subset of values associated with the plurality of predetermined technical dimensions; and
   providing a risk mitigation recommendation based on the risk value.

12. The method of claim 7, wherein the plurality of predetermined technical dimensions comprise factors related to the characteristics.

13. A tangible, non-transitory, computer-readable medium, comprising instructions that, when executed by a processor, cause the processor to:
   receive data related to characteristics of an application;
   compare the characteristics to a plurality of predetermined business dimensions related to transferability of the application to a cloud computing environment, and the plurality of predetermined business dimensions comprise at least one of a first dimension corresponding to a vendor support for the application in the cloud computing environment, a second dimension corresponding to a geographic restriction for the application in the cloud computing environment, a third dimension corresponding to a service level availability for the application in the cloud computing environment, a fourth dimension corresponding to a workload compatibility for the application in the cloud computing environment, or a fifth dimension corresponding to a security restriction for the application in the cloud computing environment; and
   based on the comparison of the characteristics to the plurality of predetermined business dimensions, generate data to display, via a graphical user interface, a report, wherein the report comprises a first polygon layer associated with the application and having vertices corresponding to the plurality of predetermined business dimensions, and the report comprises a second polygon layer associated with the cloud computing environment and having vertices corresponding to the plurality of predetermined business dimensions.

14. The tangible, non-transitory, computer-readable medium of claim 13, wherein the plurality of predetermined business dimensions includes the second dimension, and the geographic restriction comprises a geographic restriction for a user base associated with the application.

15. The tangible, non-transitory, computer-readable medium of claim 13, wherein the cloud computing environment comprises at least one environment of the following:
   a public cloud computing environment;
   a private off-premise cloud computing environment;
   a private on-premise cloud computing environment; or
   a dedicated computing environment.

16. The system of claim 1, wherein the instructions, when executed by the processor, further direct the processor to:
   identify a risk value associated with the transferability of the computing resource to the cloud computing environment, wherein the risk value is identified based on the plurality of predetermined business dimensions;
   and provide a risk mitigation recommendation based on the risk value.

* * * * *